INVENTOR.
ATHANASIUS J. PANTOS
BY Fetherstonhaugh & Co.
ATTORNEYS

INVENTOR.
ATHANASIUS J. PANTOS
BY Fetherstonhaugh & Co.
ATTORNEYS

United States Patent Office 3,444,321

Patented May 13, 1969

3,444,321
DEFECTIVE CIRCUIT DETECTOR

Athanasius J. Pantos, 132 Kingsview Blvd., Weston, Ontario, Canada

Filed Oct. 11, 1965, Ser. No. 494,643
Claims priority, application Canada, Sept. 11, 1965, 940,338
Int. Cl. H04l *25/02;* G08b *21/00*
U.S. Cl. 178—69 13 Claims

ABSTRACT OF THE DISCLOSURE

A line adapted to assume normal and nonnormal binary states is disconnectably connectable by a control switch to other circuitry. Detection means determine whether the line is in the nonnormal state for a period longer than would be encountered under proper operation. If so, the detection means disconnects the line from the circuit by disconnecting the switch. The switch is then maintained disconnected as long as the nonnormal condition exists, and when the nonnormal condition ceases, the detection means allows reconnection of the line to the circuit.

This invention relates to means and a method for ascertaining the existence of a fault condition in circuits including lines used for the transmission of binary signals; and to means for and a method of disconnecting said circuit as a result of such ascertainment.

The invention is provided with circuits including lines wherein the line has a first potential level to indicate during transmission one of the binary code symbols and a second potential state to indicate during transmission the other binary code symbol.

Usually, although not necessarily, one of said states, here designated the "normal state," corresponds to the condition of the line when no transmission is taking place, while the other state is known as the "nonnormal" state.

The invention is of particular advantage with circuitry, wherein the fault condition in a circuit having such a line affects by its presence, in a faulty condition, the operation of other equipment in the system. The operation of the invention, therefore, in ascertaining the existence of a fault and disconnecting the faulty equipment from the circuit allows the remainder of the connected system to continue to function normally. The invention is therefore of particular advantage with a binary transmission and receiving system known as a "hub coupling unit" wherein a plurality of transmitters and a plurality of receivers are connected together in such a way that one transmitter only may transmit binary information at a time.

In such a system, a faulty transmitter, which simulates, to the extent of permanently assuming the "nonnormal" binary state, a transmission condition, will prevent any other transmitter from operating. Thus, this invention will function to disconnect such a faulty transmitter, allowing the remainder of the system to operate. A hub coupling unit employing the invention is shown in the specific embodiment.

In the hub coupling unit, or in any of the other versions of the invention, the means for ascertaining a fault condition may be combined with means for indicating, in visible or audible manner, the fault condition.

The invention provides means in a binary transmission line for initiating the timing of a predetermined interval whenever said line assumes a selected binary potential state, which is one which does not correspond to the state of said line in the absence of transmission, herein referred to as a "nonnormal" state, causing the effect of such timed interval to be obliterated on the departure of the line from said selected nonnormal binary state, and for performing an operation, if said timed interval exceeds a predetermined duration. In the use of such means to disconnect a line or circuit, such predetermined time interval is selected to exceed the probable maximum sustained existence of such selected state during proper binary transmission. Hence, if the existence of a line of a circuit in such selected state exceeds such interval, then the existence of a fault in the circuit or line is indicated and thereby detected and the inventive means provides for the disconnection of the circuit or line.

It is an object of this invention to provide means and a method of determining when a circuit or line has remained in a nonnormal potential state for a period longer than that required for the continuous existence of such nonnormal state during normal transmission of binary elements and, actuated by said determination, to disconnect the faulty line or circuit from the system.

It is a further object of this invention to provide means and a method as discussed in the preceding paragraph, wherein the control means, operable to disconnect said line or circuit, is also operable after such disconnection, to reconnect said line or circuit to the system in the event that the line or system returns to the rest state.

In the discussion to follow the "nonnormal" condition is often referred to as "space" and the "normal" condition as "mark," but it will be realized that these designations are arbitrary and may be reversed.

In drawings which illustrate a preferred embodiment of the invention in combination with a hub-coupling unit:

Figure 1:
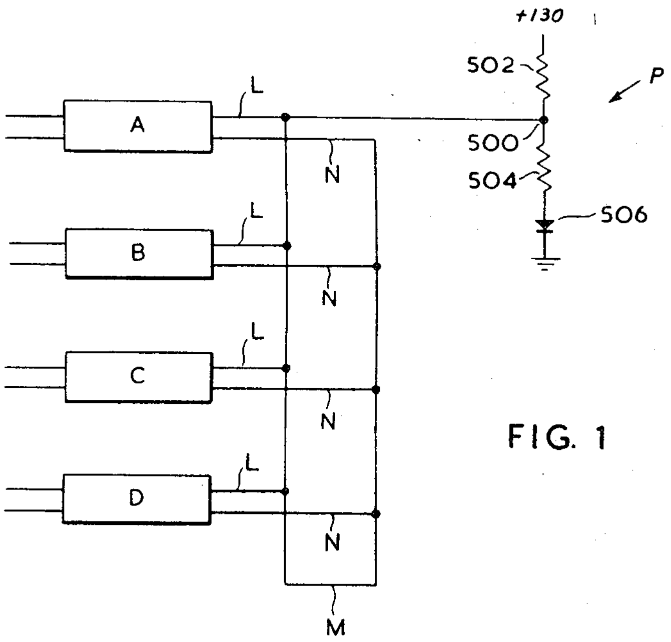
FIGURE 1 shows a hub-coupling unit wherein there are coupled a plurality of receiver-transmitter units.

In FIGURE 1 four transmitter-receiver combinations lettered A–B–C–D are shown, and the transmit lines L from the transmitter of each combination are coupled together and connected to the intermediate terminal 500 of a potentiometer P. The receive lines N of the combinations are connected together and to the line L by a shorting connection M.

If desired, the shorting line M may be replaced by a regenerative repeater, and the latter will be used to repeat for lines N signals received from line L where the system requires such regeneration.

Figure 3:
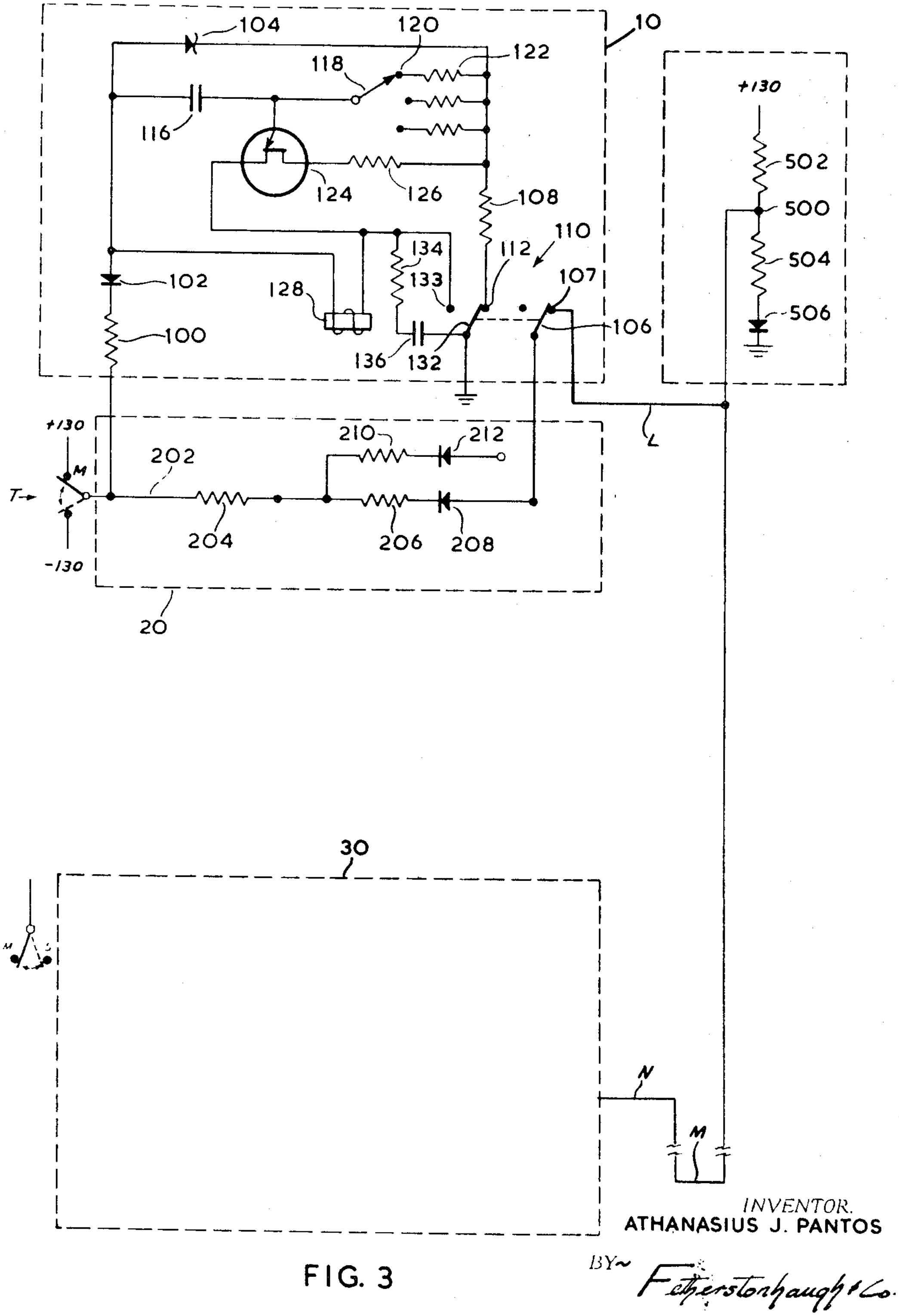
FIGURE 3 shows a detailed drawing of a transmitter in a hub-coupling unit, showing a preferred form of the circuit incorporating the invention connected to the transmitter.

In the system shown in FIGURE 3, the potentiometer P, comprising a +130 volt source, is connected through resistance 502, intermediate point 500, resistance 504 and rectifier 506, in series to ground. The transmitters herein are designed and constructed so that with no transmitter operating, the potential at point 500 will be at a predetermined level—here +60 volts, representing one of the binary states, say "mark," and also constituting the "rest" or "normal" state. On the other hand, the operation of one of the transmitters will, in accord with usual circuits of this type and the circuitry to be described, vary the potential at point 500 to −30 volts, indicative of a "space" or the "nonnormal" one of the binary states.

Because of the connections of the receivers to point 500, the potential states of the point 500 will appear at all receivers as binary signals. Simultaneous transmission by two transmitters, both affecting the potential at point 500, will prevent the intelligence of either being received, but this will not normally occur since the reception of signals, from a first transmitter at the receivers of the receiver-transmitter combination, will indicate to corresponding transmitting stations that their transmission must be delayed until prior transmissions are finished. However, the continued existence of a transmitter in the nonnormal state prevents transmission from all other transmitters. Such continued existence in the nonnormal state indicates a fault condition, which this invention is designed to ascertain and as a result to disconnect the faulty circuitry.

Figure 2:
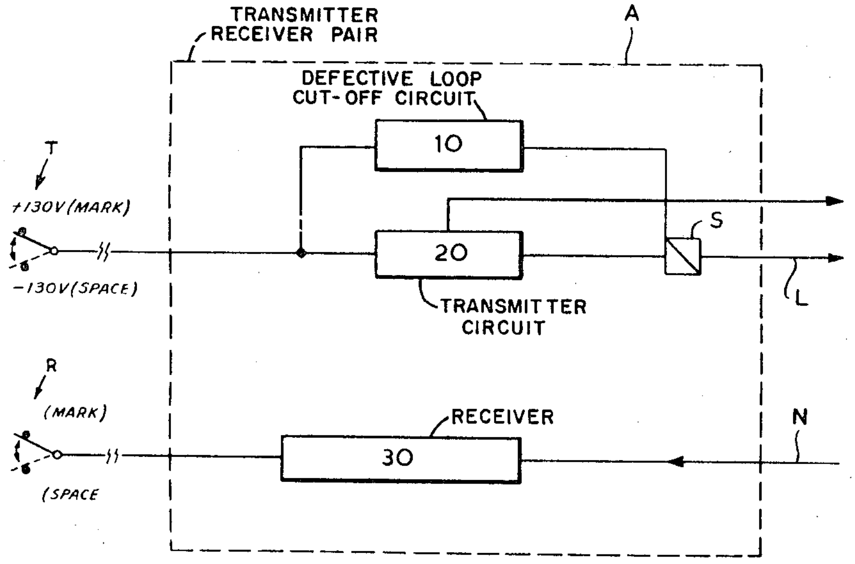
FIGURE 2 shows a block diagram of a receiver-transmitter combination.

In FIGURE 2 is shown a block diagram of the components of a transmitter-receiver pair A, wherein the device T, for applying one of two potential levels in the binary signalling, is connected along line 202 in FIGURE 3 to a defective loop cutoff circuit 10 (the subject of this invention), and a transmitter circuit 20 with the connection from the latter to the transmit line L, and from thence to terminal 500 of potentiometer P, being breakable or disconnectible at S by a control operated by the defective loop cutoff circuit 10.

Point 500 is connected through lines M and N to the receivers 30 corresponding to the transmitter 20 shown in detail in FIGURE 3; the receiver 30 is designed to produce, at the device R, an indication of "mark" or "space," conditional on the potential state of the line to receive 30. The device R may produce the "mark" or "space" indications in any one of a number of desired ways. The receiver 30, with the device R, performs a repetitive function, and this may be performed in any one of a variety of well known means or by the receiver shown in my copending application Ser. No. 498,376, filed Oct. 20, 1965.

As shown in the drawings, the line 202 connected to the transmitter 20 may, by the switching means T, be put in one of the potential states, one of which will indicate "mark" and the other of which will indicate "space" in normal binary transmission. Moreover when no transmission is taking place from any of the transmitters of the system, the line will, in the preferred embodiment, remain in one of these two positions (referred to as the "normal" state), and this will be assumed for the purposes of discussion to be "mark," although it will be realized the normal state could be "space." It will moreover be assumed that the mark and space applied at T are respectively a plus voltage (in the embodiment +130 volts) and a minus voltage (in the embodiment −130 volts), but it will also be realized that one positive and one negative potential is not necessary and that for binary signalling a voltage of one or the other polarity may be combined with a zero voltage or two levels of the same polarity may be used to distinguish one binary symbol from the other.

One of the two binary levels, therefore, will be the normal or rest state, and it will be assumed in this discussion that this is "mark," but this is not necessarily so.

Moreover it should be noted that the "rest" state need not coincide with one of the binary states. If it does not, then the inventive system may be actuated on the unduly lengthy continuance of either one of the binary informative states, either of which may be considered "nonnormal" in the sense used herein, which implies the potential state when the transmitter is not in use. However, in the discussion to follow it will be assumed that the "rest" state corresponds to one of the binary states, also therefore called the "normal" state, and therefore in the following discussion there is only one "nonnormal" state, the other binary state.

In the device of FIGURE 2, therefore, a faulty condition of the system will be in evidence if the system remains on "space" for a period longer than could normally occur under statistical considerations of the possible combinations of binary symbols and digits in the normal transmission of information. If such a fault occurs, in accord with the overall design of the system to be described, and in accord with similar systems, the transmission of other transmitters is interefred with. In addition to the disadvantage of faulty operation on the system, it is desirable that attention be drawn to the faulty system for repair purposes.

In FIGURE 3 is shown the preferred embodiment of a transmitter-receiver combination in detail, including the defective loop cutoff circuit 10. In the drawing is shown the transmitter circuit 20, including the device or switch T for applying ±130 volts to the line 202. The line 202 is connected through resistances 204, 206 and rectifier 208 in series, to one movable arm 106 of a multiple pole electromagnetic relay 110, which has an open position and a normally closed position at terminal 107. The rectifier 208 is oriented to conduct when the potential is higher at switch 106 than at the device T.

Although the schematic indication of the switch T might tend to indicate that it was manually operated, it will be realized that the indication is schematic only and that the "mark" and "space" potentials (±130 volts in the preferred embodiment) may be placed on the line 202 in accord with whatever encoding or transmission method or apparatus is used.

The switch arm 106 has an open and a closed position. In its closed position the "closed' terminal 107 is connected through line L to the intermediate terminal 500 of a potentiometer. The rectifier 506 is oriented in the specific embodiment to conduct when the potential at point 500 is higher than ground. The rectifier 506 is used, with the value as shown in the circuit, to maintain point 500 at a lower potential level during the existence of −130 volts on line 202 than would otherwise be the case. The resistances 502 and 504 are adjusted so that the voltage is preferably 60 volts at intermediate terminal 500 during the existence of the "mark" potential of 130 volts on the lines 202 of all transmitters—i.e., voltage when no potential from a transmitter is affecting the voltage of point 500.

It will be seen that this situation exists when the potential at each line 202 is at +130 volts, so that in each transmitter the effect of the +130 volts is blocked by the rectifier 206.

On the other hand, with the switch or signalling device T of one transmitter at −130 volts, the potential of point 500 will go to −30 volts.

These then are the voltages (+60 volts and −30 volts) which convey the binary information to other receivers.

As indicated in FIGURE 1, such voltages appear not only on all transmit lines L but also through short M on all receive lines N. (If short M is replaced by a regenerative repeater, then all lines N are subject to equivalent voltages provided through the regenerative repeater.) Thus with two transmitters operating simultaneously (an unwanted situation), the intermediate terminal 500, subjected to two simultaneous "space" signals, will reach a potential slightly more positive than −60 volts, a fault situation. Moreover the intereffect of the two binary transmissions will prevent the intelligence of either from being conveyed. An analogous situation will exist if one transmitter is continuously on space due to a fault condition and another transmitter attempts to transmit; the result is that the information provided by the second transmitter is not provided to receivers in useful form.

A resistor 210 and rectifier 212 are also provided, connected in series to line 202, between resistances 204 and 206, with the rectifier 212 oriented to conduct with a potential gradient across it falling in the direction of line 202. The terminal of the rectifier 212 remote from the line 202 may be connected to a source higher than −130 volts through actuation means for a light or bell or other sensible indication that the transmitter is operating.

Between the transmitter end of line 202 and ground are connected the following elements in series: resistance 100; a rectifier 102, oriented to conduct with the potential gradient decreasing in the direction of line 202; a Zener diode 104; and a resistance 108 to one fixed terminal 112 of multiple pole relay 110 whose corresponding movable terminal is connected to ground. The Zener diode 104 is designed and constructed to conduct with potential gradients in the opposite direction to its conduction direction, when such opposite potential across the diode exceeds 24 volts. The voltage drop across such diode is a substantially constant 24 volts in such situations.

The Zener diode 104 is connected in parallel with a condenser 116, the movable arm 118 of a three (or other plural) position switch; the selected one of the fixed positions 120 and the correspondingly selected resistance 122. The three (or other plurality) of resistances 122 are in stepped values so that by setting the movable arm 118 to the appropriate resistance, the charging time of the condenser 116, when the 24 volts is applied across the Zener diode 104, may be controlled. A unijunction transistor 124 has one of its end terminals connected through a resistance 126 to the junction of the three resistances 120, and the other of its end terminals connected through a relay coil 128 to the connection between the rectifier 102 and the Zener diode 104. The intermediate connection of the transistor 124 is connected to the connection between the movable switch arm 118 and the condenser 116. The unijunction transistor is designed to conduct when the voltage from the terminal connected to resistance 126 and the central terminal is at a predetermined value, here about −12 volts. The relay 128, at its end remote from the rectifier 102, is, in addition to its connection to a unijunction transistor, connected to a fixed terminal 133 (being the alternate to therminal 112) of the switch 110, whereby it may be contacted by a movable arm 132 of the switch 110 when the switch is moved by the solenoid. The movable arms 106 and 132 of switch 110 are ganged, as shown. The end of the relay 128 remote from the rectifier 102 is also connected to ground through a resistor 134 and condenser 136 in series. The two ganged switch arms 106 and 132 are operable by energization of the relay 128, to move to a position to disconnect line 202 from the potentiometer terminal 500 and to disconnect ground from resistance 108 and to connect it to the terminal 133 and on deenergization the ganged switch arms are biased to cause them to move in the opposite direction, to disconnect the relay 128 from its direct connection to ground and to connect the resistance 108 to ground and also to reconnect the transmitter line 202 to the potentiometer terminal 500.

In operation, the circuitry of the cutoff circuit is, when unaffected by the line 202 through rectifier 102, at ground potential. It will be realized that this unaffected potential may be other than ground and must be higher than the more negative state by more than the Zener voltage. When the transmitter T is at mark, and line 202 therefore at +130 volts, the potential in the control circuit is unchanged because of the blocking effect of the rectifier 102. Thus the relay 128 is deenergized and the ganged switch arms 132 and 106, respectively, assume their normal positions and connect the line 202 to the potentiometer terminal 500 and connect ground to the resistance 108 and hence to the three resistances 122 associated with the movable switch arm 118. When the transmitter moves to "space" and −130 volts is applied to the line 202, a conducting circuit is completed from ground through resistance 108, Zener diode 104, rectifier 102 and resistance 100 to line 202. The Zener diode 104 sets the voltage drop across it toward line 202 at 24 volts and the voltage appears across the selected resistace 122 and condenser 116. In this situation when the current flows through the connected one of the resistances 122 to the condenser 116 for a sufficient interval (determined by the resistance of the selected resistor 122) to charge the condenser to 12 volts, this potential appears across the central terminal, and the end terminal connected to rectifier 102 of transistor 124 and renders the transistor conducting and the condenser voltage discharges through the relay 128, moving switch arms 106 and 132 to the nonnormal position to respectively disconnect line 202 and to connect the relay 128 to ground through arm 132.

The resistances 122 connectible to the movable switch arm 118 are chosen to set the interval for the charging of the condenser 116 to 12 volts, at a length of time which is longer than the maximum probable time for a continuous space state under proper transmission of information. Thus the charging of the condenser 116 and the discharge through the transistor 124 is, after a predetermined interval, set to be longer than the continuance of a space under all proper operating conditions and the disconnection of arm 106 indicates a fault condition evidenced by the fact that line 202 has remained on "space" for an undue period of time.

The movement of switch arm 132 to connect the relay 128 directly to ground locks in this relay and maintains the disconnection of line 202 from the potentiometer as long as the −130 volts remains on the line 202. On the other hand, as soon as the −130 volts is removed, the relay 128 is deenergized, the ganged switch arms move to their normal positions, and the line 202 is reconnected to potentiometer P. Hence it will be realized that a temporary fault condition will, as with any "space," start the timing cycle as set by condenser 116 and the connected resistance 122, but whether or not the interval has been sufficient to actuate the switch, the condenser 116 will be discharged at the end of each space condition and the effects of the initiation of the timing cycle obliterated. On the other hand, under proper transmission of binary signals, the sustained interval of spaces will be less than the predetermined time interval for accumulation of charge by condenser 116, and during each such interval condenser 116 will not reach the correct value. Thus, in accord with the operation of the invention, a faulty condition evidenced by a sustained space condition on line 202 causes line 202, and hence the faulty equipment connected thereto, to be disconnected and hence the operation of the remainder of the system is not affected. On the other hand, after such disconnection has taken place, if the fault condition is remedied, the appearance of +130 volts on the corresponding line 202 causes deenergization of relay 128 and switches line 202 again into connection with point 500 and discharges condenser 116.

In the specific form of the invention, when used with a hub potentiometer, it will be noted that the connection of a "space" voltage of −130 volts from one line 202, indicating transmission by the corresponding transmitter, lowers the potentiometer voltage from +60 to −30. This change of potentiometer potential indicates a space to receivers in all parts of the system. Thus, the existence of a faulty transmission circuit in the nonnormal (here the "space" state) prevents the transmission by any other transmitter connected to the system. Hence the disconnection of the system automatically allows the remainder of the system to function normally.

It will also be noted that the energization of the relay 128 on determination of a fault condition may be used to actuate a sensible alarm or indication that the transmission circuitry requires repair.

What I claim as my invention is:

1. In a hub coupling unit wherein a plurality of transmitter lines are coupled together at a hub, means corresponding to each of such lines for disconnecting the corresponding line from said hub, each of such lines being adapted to assume a normal and a nonnormal potential state, when a fault condition is evidenced on said line comprising: a controllable switch for disconnectably connecting said line to said hub, a control circuit for said switch connected at one end to said line, and connected at the other end to a potential level in a manner to set the level of said circuit excluding the effect of said line; said potential level being between the potentials corresponding to the nonnormal state to affect in the connection from said line to said control circuit, oriented to prevent potentials of the normal one of said states from affecting said control circuit, and to conduct potentials corresponding to the nonnormal state to affect said circuit, means in said control circuit actuable on the continuance of the nonnormal state for a predetermined period which is longer than the period for such nonnormal state if no fault condition existed to actuate said switch to disconnect said line from said hub.

2. A device as claimed in claim 1, wherein conduction through said rectifier causes charging of a condenser in said control circuit through a resistance, causing it to reach a predetermined level in said predetermined interval, means actuable by said condenser reaching said level for operating said switch and disconnecting said line from said hub.

3. A device as claimed in claim 2, including means operable by the disconnect movement of said switch for releasably holding said switch in disconnect position.

4. A device as claimed in claim 3, including means operable on the cessation of said nonnormal state after its continuance beyond said predetermined time for causing said switch to reconnect said line to said hub.

5. In combination with a line adapted to assume two potential states to convey binary information, the normal one of said states also existing when no information is being conveyed, a switch for disconnectably connecting said line to a coupling for a group of such lines; means operable by the existence of the nonnormal state for initiating the operation of time measuring means, means actuable on the reversion of said circuit to the normal state for resetting said time measuring circuit, and means actuable on the continued operation of said time means for a predetermined period which is longer than such operation during normal binary transmission to cause said switch to disconnect said line from said coupling.

6. In combination as claimed in claim 5, wherein said time measuring means comprises a condenser and resistance connected in series in said circuit, means operable by the existence of the nonnormal state for causing said condenser to charge, through said resistance, means actuable by the voltage on said condenser reaching a predetermined amount for causing said switch to disconnect said line from said coupling.

7. A combination as claimed in claim 6, including means allowing the discharge of said condenser on said line reassuming said normal state.

8. In combination as claimed in claim 5, wherein said control circuit includes a rectifier, a condenser and resistance in series, with one end of said elements in series being connected to a potential intermediate the normal and nonnormal line potentials, said rectifier being connected to conduct when said line is in said nonnormal state, and the other end of said elements in series being connected to said first extent, means actuable by said condenser reaching a predetermined potential for causing said switch to disconnct said line from said couplings.

9. In combination as claimed in claim 8, having a device in parallel with said resistance and condenser for providing a constant potential thereacross when said line is in its nonnormal state.

10. A fault disconnect circuit for a line used for binary transmission and connected to a hub of a hub coupling unit, said line being adapted to assume two potential levels as a result of operations on said line and a controllable switch disconnectably connecting said line to such hub, the binary transmission used having a predetermined probable maximum time in one of said states in accord with the binary code used; a control circuit for said switch connected at one end to said line and connected at the other end to a potential level intermediate said two potential levels, adapted to set the level of said circuit when unaffected by said line; a rectifier in the connection from said line to said control circuit to allow potentials corresponding to said one of said states to affect said circuit and to prevent potentials corresponding to the other of said states from affecting said circuit; means in said control circuit actuable on the continuance of said one of said states for a period longer than said probable maximum time to actuate said switch to disconnect said line from said hub.

11. A device as claimed in claim 10, wherein the potential level of said line corresponding to conduction through said rectifier causes charging of a condenser through a resistance, causing said condenser to reach a predetermined potential level in said predetermined interval, means actuable by said condenser reaching said level for operating said switch and disconnecting said line from said hub.

12. A device as claimed in claim 11, including means operable by the disconnect movement of said switch and the continuance of said potential level for disconnectably holding said switch in disconnect position.

13. A device as claimed in claim 12, including means operable on the cessation of said state after existing beyond said probably maximum time for causing said switch to reconnect said line.

References Cited

UNITED STATES PATENTS

| | | | |
|---|---|---|---|
| 3,288,929 | 11/1966 | Hutchinson | 178—69 |
| 3,317,668 | 5/1967 | Johnsen | 178—69 |
| 3,331,921 | 7/1967 | Neiswinter et al. | 178—69 |
| 3,331,923 | 7/1967 | Neiswinter et al. | 178—69 |

THOMAS A. ROBINSON, *Primary Examiner.*

U.S. Cl. X.R.

340—147, 253